(12) United States Patent
Shida

(10) Patent No.: US 6,398,893 B1
(45) Date of Patent: Jun. 4, 2002

(54) METHOD OF MANUFACTURING PNEUMATIC TIRE

(75) Inventor: Sunao Shida, Sayama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/526,054

(22) Filed: Mar. 15, 2000

(30) Foreign Application Priority Data

Mar. 15, 1999 (JP) ............................................. 11-067784

(51) Int. Cl.$^7$ ............................. B29D 30/16; B60C 5/12
(52) U.S. Cl. ..................... 156/130; 152/510; 152/548; 152/551; 156/123; 156/130.7; 156/133
(58) Field of Search ................................ 156/123, 130, 156/130.7, 133; 152/550, 551, 510, 548

(56) References Cited

U.S. PATENT DOCUMENTS 5,795,416 A * 8/1998 Willard, Jr. et al. ........ 152/517
5,820,710 A * 10/1998 Behnsen et al. ............ 152/541

FOREIGN PATENT DOCUMENTS

| DE | 19804069 | | 8/1999 | |
|---|---|---|---|---|
| EP | 0761478 | | 3/1997 | |
| GB | 906538 | | 9/1962 | |
| JP | 3-148305 A | * | 6/1991 | ................ 152/551 |
| JP | 11-11109 | | 1/1999 | |
| WO | 98/38049 | | 9/1998 | |

* cited by examiner

*Primary Examiner*—Geoffrey L. Knable
(74) *Attorney, Agent, or Firm*—Sughrue Mion, PLLC

(57) ABSTRACT

A pneumatic tire having an excellent tire uniformity without air leakage is manufactured by laying a central innerliner, belt layers and tread rubber on an outer circumference of a shaping drum with an outer surface form being approximately the same as an inner surface form of a tire product, and laying an approximately ring-shaped sidewall assembly comprising a bead core provided with a bead filler, a side carcass layer, an outside innerliner and the like on each side face of the shaping drum without a step of expanding and deforming a green case into an approximately semi-circular form.

6 Claims, 3 Drawing Sheets

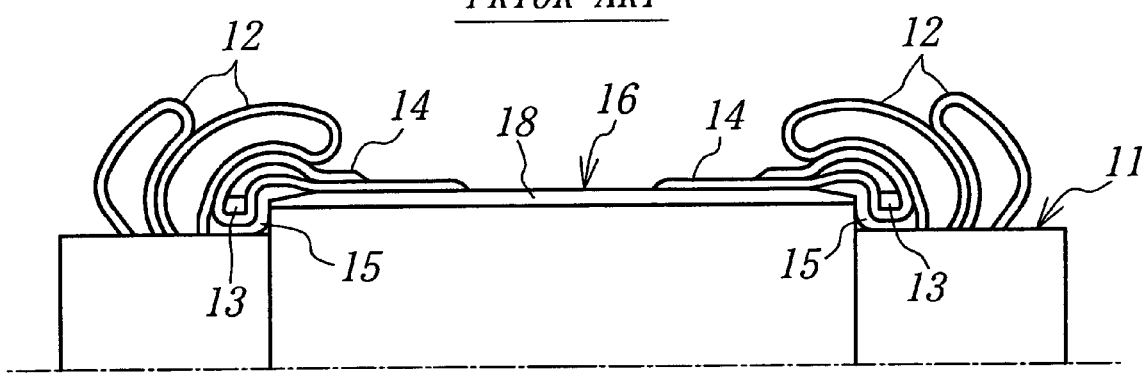
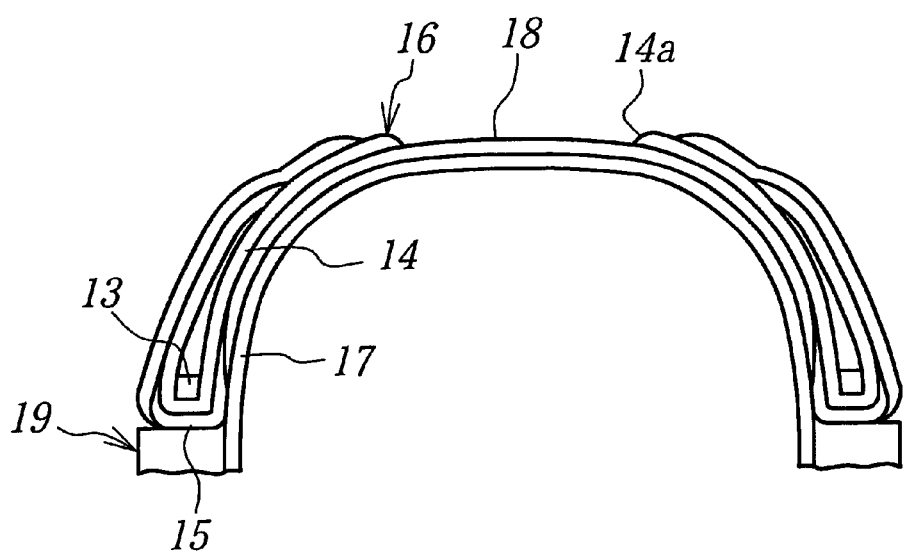

METHOD OF MANUFACTURING PNEUMATIC TIRE

BACKGROUND OF THE INVENTION

1. Field of the Invention

This invention relates to a method of manufacturing a pneumatic tire wherein a carcass ply is divided in a central portion of a tread as well as a pneumatic tire manufactured by this method.

2. Description of Related Art

Recently, a frequency of running a vehicle at a high speed becomes higher together with the servicing of express ways and so on, and hence pneumatic tires are is demanded to indicate a low road noise. As a pneumatic tire capable of running at a low road noise, JP-A-11-11109 proposes a pneumatic tire wherein a carcass ply is divided in a central portion of a tread at a state of removing a central portion of the carcass ply to give a flexibility to the tread portion. Such a tire is very advantageous to improve both steering stability and ride comfort against vibrations.

If it is intended to manufacture such a pneumatic tire by the well-known method, as shown in FIG. 5, an innerliner 18 is first wound on a central zone of a first cylindrical shaping drum 11 and wire chafer 15 is wound on each side zone thereof, and thereafter a pair of side carcass layers 14 are wound on the outsides of the innerliner and wire chafer so as not to locate them on a center of the first shaping drum. Then, the central zone of the first shaping drum is somewhat enlarged to form a step difference in the side carcass layer and further a bead core 13 provided with a filler is set on the outside of the step difference of the side carcass layer. Next, a folded bladder 12 of the first shaping drum 11 is expanded to turn up the side carcass layer 14 and wire chafer 15 located outward from the bead core 13 around the bead core 13. Then, a rubber chafer and a sidewall rubber previously joined to each other are wound on an outer circumference of a turnup portion of the side carcass layer to form a green case 16.

After the thus formed green case 16 is transported onto a second shaping drum 19, as shown in FIG. 6, a shaping bladder 17 is expanded in the green case 16 while approaching the bead cores 13 to each other, whereby the green case 16 is shaped into an approximately semi-circular form at its section. Thereafter, a cylindrical belt-tread band formed in another band shaping drum is supplied to the circumference of the green case 16 and laid thereon to form a green tire.

However, when the green case 16 is deformed into the approximately semi-circular form at its section by the shaping bladder 17 of the second shaping drum 19, since only the innerliner 18 having a very low stiffness is existent between top ends 14a of the side carcass layers 14, the innerliner 18 is stretched therebetween to make the thickness thereof thin. As a result, there are problems that air leakage is caused in a tire product and tire uniformity lowers. And also, the position of the top end 14a of the side carcass layer 17 becomes unstable due to the stretching of the innerliner 18, which further degrades the tire uniformity.

SUMMARY OF THE INVENTION

It is, therefore, an object of the invention to solve the above problems of the conventional technique and to provide a method of manufacturing a pneumatic tire which can improve the tire uniformity while preventing the occurrence of air leakage as well as pneumatic tires manufactured by this method.

According to a first aspect of the invention, there is the provision of a method of manufacturing a pneumatic tire, comprising the steps of:

a step of laying a central innerliner on an outer circumference of a shaping drum with an outer surface form being approximately the same as an inner surface form of a tire product;

step of laying an approximately ring-shaped sidewall assembly comprising a bead core provided with a bead filler, a side carcass layer folded so as to envelop a circumference of the bead core provided with the bead filler and an outside innerliner laid on an innermost side of the side carcass layer on each side face of the shaping drum;

a step of laying a belt comprised of plural belt layers on the circumference of the central innerliner and sandwiching a top end of the outside innerliner and an inside top end of the side carcass layer between side end portions of the belt and the central innerliner; and a step of laying a tread rubber on the circumference of the belt.

According to a second aspect of the invention, there is the provision of a method of manufacturing a pneumatic tire, comprising the steps of:

a step of laying a central innerliner on an outer circumference of a shaping drum with an outer surface form being approximately the same as an inner surface form of a tire product;

a step of laying a part of plural belt layers constituting a belt on the circumference of the central innerliner;

a step of laying an approximately ring-shaped sidewall assembly comprising a bead core provided with a bead filler, a side carcass layer folded so as to envelop a circumference of the bead core provided with the bead filler and an outside innerliner laid on an innermost side of the side carcass layer on each side face of the shaping drum;

a step of laying the remaining belt layer on the circumference of the belt layer and sandwiching a top end of the outside innerliner and an inside top end of the side carcass layer between side end portions of the precedently laid belt layer and subsequently laid belt layer; and a step of laying a tread rubber on the circumference of the belt.

As mentioned above, in the manufacture of the pneumatic tire according to the invention, the central innerliner, belt layers and tread rubber are laid on the outer circumference of the shaping drum having an outer surface form being approximately the same as an inner surface form of a tire product, and the sidewall assembly of approximately the ring-shaped form having the bead core provided with the bead filler, the side carcass layer and the outside innerliner is laid on each side face of the shaping drum, so that a step of expanding and deforming the green case into approximately the semi-circular form is removed and hence the innerliner is not locally stretched. Thus, the occurrence of air leakage in the tire product can be prevented and also the tire uniformity can be improved because the position of the top end of the side carcass layer is stabilized.

Particularly, when the top end of the outside innerliner and the inside top end of the side carcass layer are sandwiched between the side end portions of the belt layers, the position of the top end of the side carcass layer is can further be stabilized and a certain internal tension can be applied to the side carcass layer, whereby the tire uniformity can be more improved.

In a preferable embodiment of the invention, the sidewall assembly further comprises a cord-reinforced chafer laid on the circumference of the side carcass layer so as to envelop the bead core and a sidewall rubber laid on the circumference of the side carcass layer outward from a top end side of the chafer.

BRIEF DESCRIPTION OF THE DRAWINGS

The invention will be described with reference to the accompanying drawings, wherein:

FIG. 5 is a diagrammatically partial section view illustrating a folding step according to the conventional technique; and FIG. 6 is a diagrammatically partial section view of a green case manufactured according to the conventional technique.

DESCRIPTION OF PREFERRED EMBODIMENTS

Figure 1:
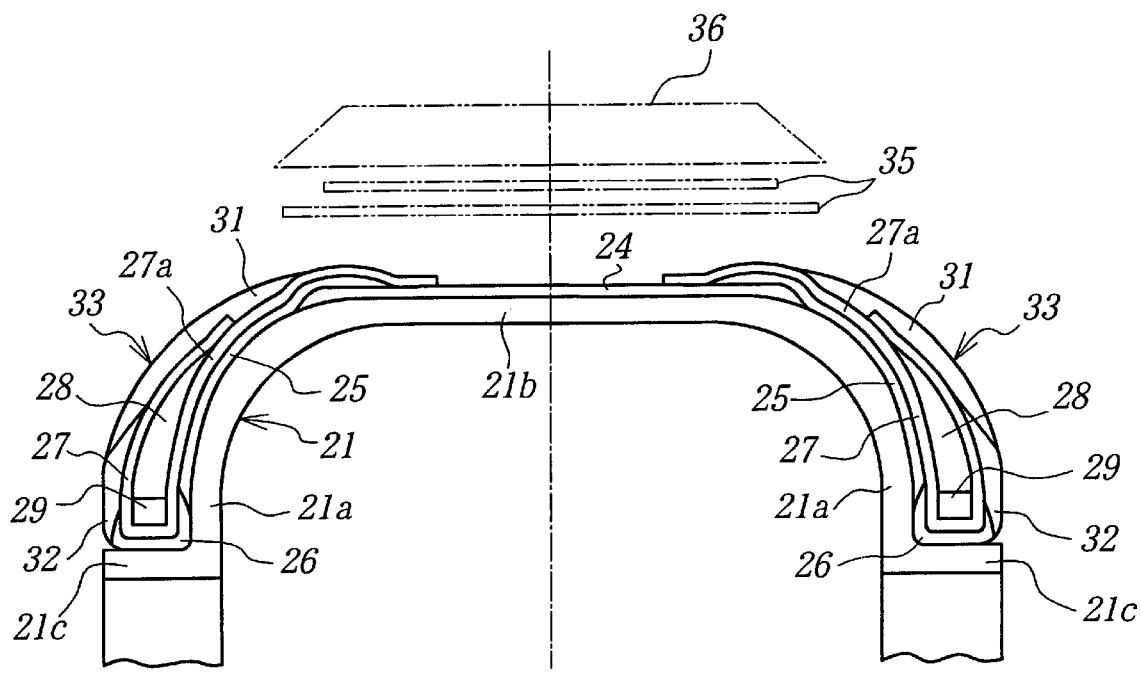
FIG. 1 is a diagrammatically partial section view illustrating a first embodiment of the green case by the method according to the invention.

In FIG. 1 is shown an embodiment of the first method of manufacturing a pneumatic tire according to the invention, wherein numeral 21 is a ring-shaped metal shaping drum with an outer surface form being approximately the same as an inner surface form of a tire product, which comprises a pair of collar portions 21a extending substantially in a radial direction of the drum, a cylindrical portion 21b connecting radially outer ends of the collar portions 21a to each other and having an outer diameter approximately equal to an inner diameter of the tire product, and a cylindrical flange portion 21c fixed to a radially inner end of the collar portion 21a and extending outward in an axial direction of the drum. Moreover, the shaping drum 21 is constructed by arranging a plurality of arc-shaped segments, each of which segments consisting of the collar portions 21a, the cylindrical portion 21b and the flange portions 21c, at a closed state in a circumferential direction of the drum and connecting them to each other. Therefore, if it is intended to decompose the shaping drum 21, the connection between the segments is first released and then the segments are moved inward in the radial direction of the drum in a given order.

When a pneumatic tire is manufactured by using the shaping drum 21, a band-shaped central innerliner 24 having a width somewhat wider than ⅓ of a width of the conventionally used innerliner is first supplied to the shaping drum 21 and laid on an outer circumference of the cylindrical portion 21b in a cylindrical form while rotating the shaping drum 21 about its center axis.

Aside from this, a sidewall assembly is shaped as follow.

That is, a band-shaped outside innerliner 25 having a width corresponding to about ⅓ of the width of the conventionally used innerliner is supplied to another cylindrical drum (not shown) and laid on an outer circumference thereof. Then, a band-shaped chafer 26 reinforced with steel cords or organic fiber cords is supplied to the drum and laid on the outer circumference thereof while overlapping a widthwise end portion of the chafer 26 with a widthwise end portion of the outside innerliner 25. Thereafter, a band-shaped side carcass layer 27 having a width wider than a total width of the outside innerliner 25 and the cord-reinforced chafer 26 is supplied to the drum and laid on the outer circumference thereof while the outside innerliner 25 and the cord-reinforced chafer 26 are covered with a widthwise end portion of the side carcass layer 27.

After a bead core 29 provided with a bead filler 28 is supplied and set at the outside of the cord-reinforced chafer 26 in the radial direction of the drum, a portion of the cord-reinforced chafer 26 located outward from the bead core 29 in the widthwise direction and the other widthwise end portion of the side carcass layer 27 are turned around the bead core 29 to envelop the bead filler 28 and the bead core 29 with the side carcass layer 27. Then, a band-shaped sidewall rubber 31 and a band-shaped rubber chafer 32 previously joined to each other are supplied to the drum so as to locate the sidewall rubber 31 at one side in the widthwise direction and the rubber chafer 32 at the other side in the widthwise direction and laid on the outer surface of the turnup portion of the side carcass layer 27.

As mentioned above, the sidewall assembly is shaped by enveloping the bead filler 28 and bead core 29 with the turnup portion of the side carcass layer 27, laying the outside innerliner 25 on the innermost side of the aide carcass layer 27, laying the cord-reinforced chafer 26 and the rubber chafer 32 on the side carcass layer 27 so as to envelop the bead core 29, and laying the sidewall rubber 31 on the portion of the side carcass layer 27 located outward from the top of the rubber chafer 32.

Then, the thus shaped sidewall assembly 33 is enlarged centering on a base part corresponding to the position of the bead core 29 from a cylindrical form to a ring form. A pair of the ring-shaped sidewall assemblies 33 are laid on both side faces (outer side faces) of the shaping drum 21 in such a manner that the base part of the sidewall assembly is fitted onto the outer surface of the flange portion 21c and the outer surface of the outside innerliner 25 is contacted with the outer surface of the collar portion 21a. In this case, the top end portion of the outside innerliner 25 and the top end portion at the inside 27a of the side carcass layer 27 are piled on each widthwise end portion of the central innerliner 24 previously laid on the shaping drum 21.

Thereafter, plural band-shaped belt layers, two belt layers 35 in the illustrated embodiment, each having a width approximately equal to a width of the central innerliner 24, are successively supplied to the shaping drum 21 and laid on the outer circumference of the central innerliner 24. Thus, the top end portion of the outside innerliner 25 and the top end portion at the inside 27a of the side carcass layer 27 are sandwiched between the widthwise end portion of the belt layer 35 and the widthwise end portion of the central innerliner 24. Next, a band-shaped tread rubber 36 is supplied to the shaping drum 21 and laid on the outer circumference of the belt layer 35. Then, stitching is carried out by a stitching device (not shown) to form a green tire.

That is, the green tire is manufactured only by laying the central innerliner 24, belt layers 35 and tread rubber 36 on the outer circumference of the shaping drum 21 with an outer surface form being approximately the same as an inner surface form of a tire product, and laying the approximately ring-shaped sidewall assembly 33 comprising the bead core 29 provided with the bead filler 28, side carcass layer 27, outside innerliner 25, cord-reinforced chafer 26, rubber chafer 32 and sidewall rubber 31 on each side face of the shaping drum 21, so that it is not necessary to take a step of expanding and deforming the green case into an approximately semi-circular form as in the conventional technique and hence there is caused no local stretching of the innerliner. As a result, the occurrence of air leakage can be prevented in the tire product, and the tire uniformity can be improved because the top end at the inside 27a of the side carcass layer 27 is stably positioned.

Then, the green tire is taken out from the shaping drum 21 by releasing the connection between the segments constituting the shaping drum 21 and removing out these segments inward in the radial direction in a given order. Thereafter, the green tire is placed in a curing apparatus and cured at a high temperature under a high pressure to manufacture a pneumatic tire 37 as a tire product.

Figure 2:
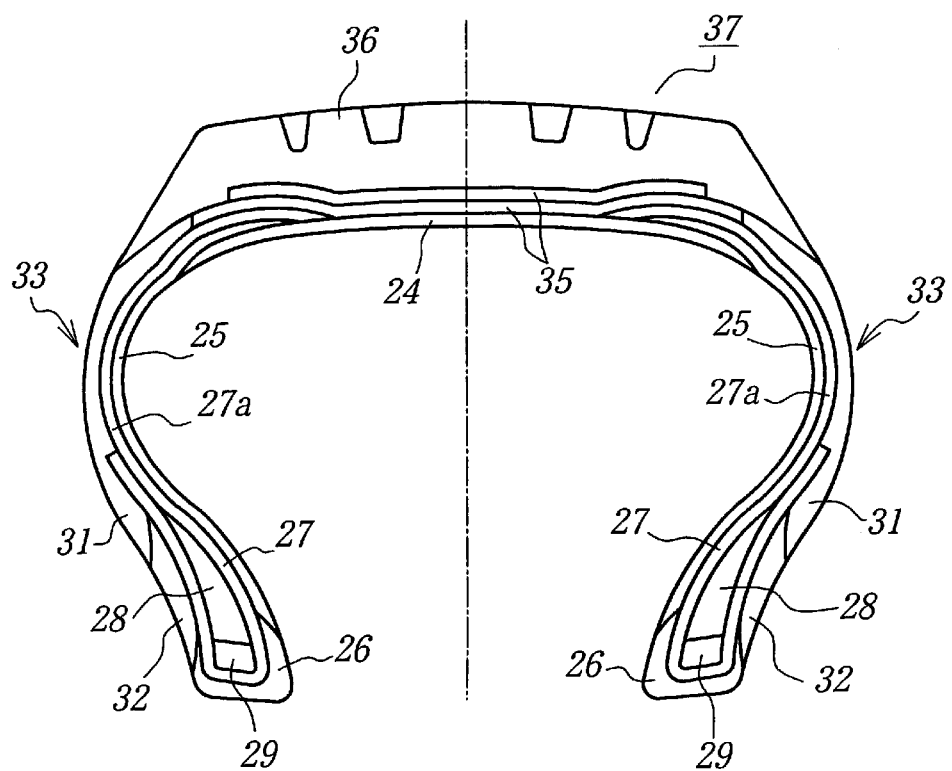
FIG. 2 is a diagrammatically section view of a first embodiment of the pneumatic tire manufactured by the method according to the invention.

As shown in FIG. 2, the thus manufactured pneumatic tire 37 comprises the central innerliner 24 of approximately a cylindrical form, plural belt layers 35 laid on the circumference of the central innerliner 24, the tread rubber 36 laid on the circumference of the belt layer 35, a pair of the bead cores 29 each provided with the bead filler 28 substantially extending outward in the radial direction, a pair of the side carcass layers 27 each turned around the bead core 29 to form a turnup portion enveloping the bead filler 28 and the bead core 29, the outside innerliner 25 laid on the inner surface at the inside 27a of the side carcass layer 27, the cord-reinforced chafer 26 and rubber chafer 32 laid on the side carcass layer 27 so as to envelop the bead core 29, and the sidewall rubber 31 laid on the side carcass layer 27 located outward from the rubber chafer 32 in the radial direction, wherein the top end portion of the outside innerliner 25 (outer end portion in the radial direction) and the top end portion at the inside 27a of the side carcass layer 27 (outer end portion in the radial direction) are sandwiched between the widthwise end portions of the belt layer 35 and the central innerliner 24.

Figure 3:
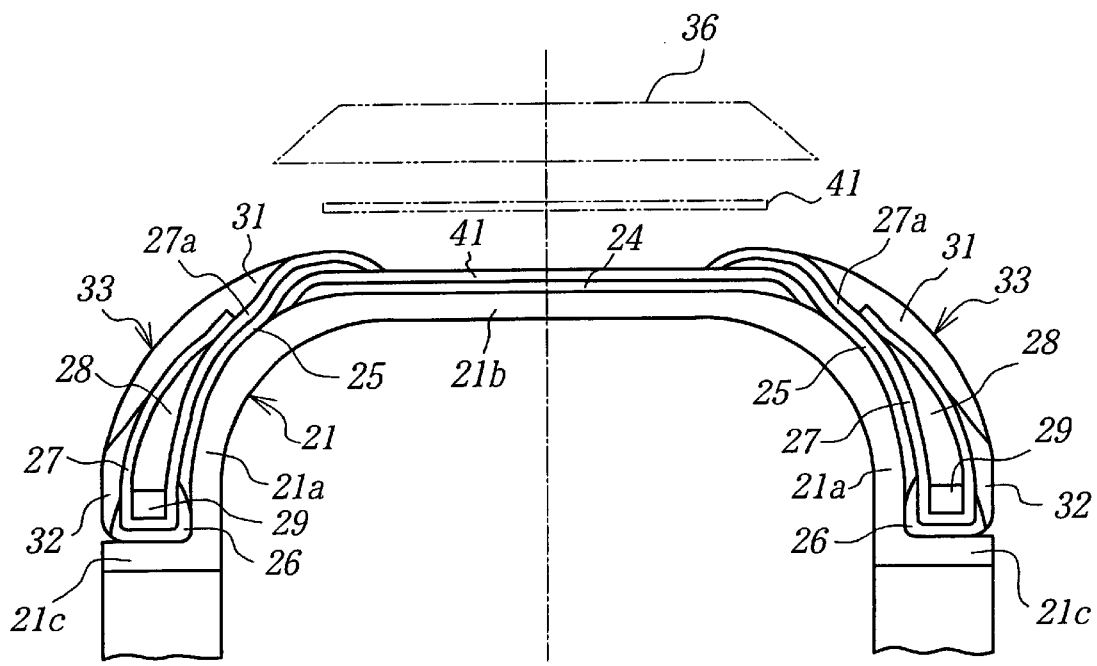
FIG. 3 is a diagrammatically partial section view illustrating a second embodiment of the green case by the method according to the invention.

In FIG. 3 is shown an embodiment of the second method of manufacturing a pneumatic tire according to the invention. In this embodiment, a part of belt layers 41 or one belt layer 47 in the illustrated embodiment is laid on the circumference of the central innerliner 24 after the central innerliner 24 is laid on the outer circumference of the shaping drum 21. Then, the same sidewall assembly 33 as mentioned above is laid on each side face of the shaping drum 21, wherein the top end portion of the outside innerliner 25 and the top end portion at the inside 27a of the side carcass layer 27 are piled on each of both widthwise end portions of the belt layer 41 previously laid on the shaping drum 21.

Next, the remaining belt layer 41 is laid on the circumference of the precedently laid belt layer 41, whereby the top end portion of the outside innerliner 25 and the top end portion at the inside 27a of the side carcass layer 27 are sandwiched between the widthwise end portion of the precedently laid belt layer 41 and the widthwise end portion of the subsequently laid belt layer 41. Thereafter, the tread rubber 36 is laid on the circumference of the belt layer 41. In this way, the top end of the side carcass layer 27 is more stably positioned and internal tension is applied from the belt layer 41 to the side carcass layer 27 to a certain level, whereby the tire uniformity can be more improved. Moreover, the other steps, function and effects are the same as those in the first embodiment.

Figure 4:
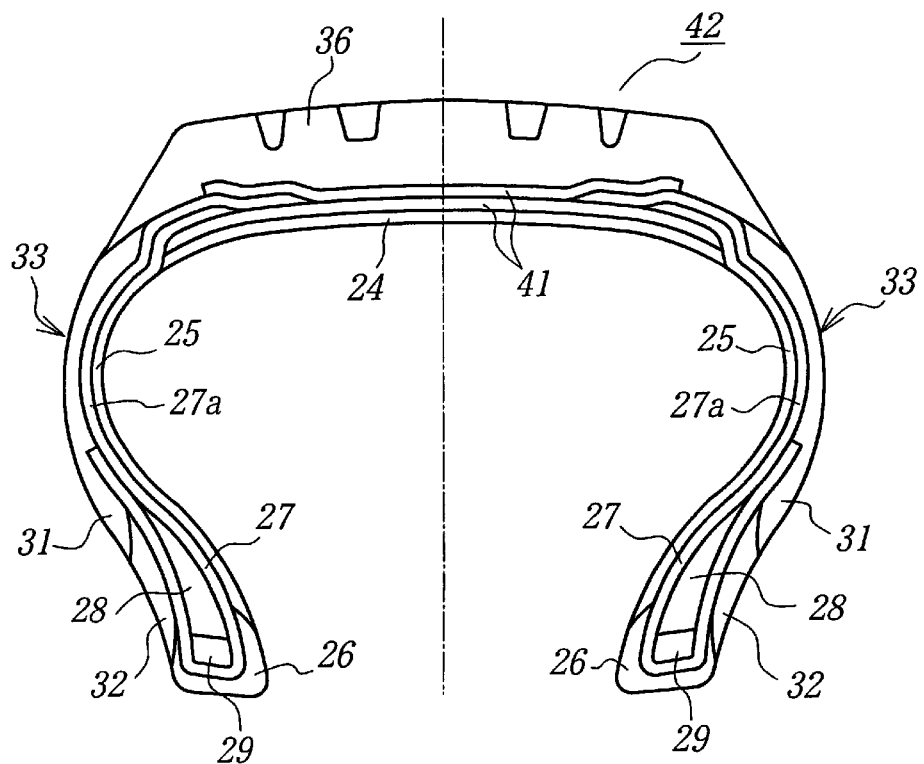
FIG. 4 is a diagrammatically section view of a second embodiment of the pneumatic tire manufactured by the method according to the invention.

As shown in FIG. 4, the pneumatic tire 42 manufactured by the second method according to the invention is different from the pneumatic tire 37 in only a point that the top end portion of the outside innerliner 25 and the top end portion at the inside 27a of the side carcass layer 27 are sandwiched between the widthwise end portions of the adjoining belt layers 41.

In the invention, many variations and modifications may be made without departing from the spirit and scope of the invention. Although the sidewall assembly 33 is constituted with the outside innerliner 25, cord-reinforced chafer 26, side carcass layer 27, bead filler 28, bead core 29, sidewall rubber 31 and rubber chafer 32 in the above illustrated embodiments, it may be constituted with the outside innerliner, side carcass layer, bead filler and bead core. In the latter case, the sidewall assembly is laid on each side face of the shaping drum and thereafter it is required to lay the chafer and sidewall rubber previously joined to each other on the circumference of the sidewall assembly while deforming them into a ring form. In the above-illustrated embodiments, it is enough to merely lay the ring-shaped sidewall assembly on the side face of the shaping drum, so that the manufacturing steps becomes simple and the production cost can be decreased.

In the illustrated embodiments, the shaping drum 21 is constituted by a plurality of arc-shaped segments closely arranged in the circumferential direction of the drum, but may be an expandable shaping bladder. And also, the whole of the chafer may be made of rubber instead of using the cord-reinforced chafer, or an auxiliary belt layer may be arranged on the belt layer.

As mentioned above, according to the invention, the tire uniformity can be improved while preventing the occurrence of air leakage.

What is claimed is:

1. A method of manufacturing a pneumatic tire, comprising the steps of:

a step of laying a central innerliner on an outer circumference of a shaping drum with an outer surface form being approximately the same as an inner surface form of a tire product;

a step of laying an approximately ring-shaped sidewall assembly comprising a bead core provided with a bead filler, a side carcass layer folded so as to envelop a circumference of the bead core provided with the bead filler and an outside innerliner laid on an innermost side of the side carcass layer on each side face of the shaping drum;

a step of laying a belt comprised of plural belt layers on the circumference of the central innerliner and sandwiching a top end of the outside innerliner and an inside top end of the side carcass layer between side end portions of the belt and the central innerliner; and a step of laying a tread rubber on the circumference of the belt.

2. The method according to claim 1, wherein the sidewall assembly further comprises a cord-reinforced chafer laid on the circumference of the side carcass layer so as to envelop the bead core and a sidewall rubber laid on the circumference of the side carcass layer outward from a top end side of the chafer.

3. A pneumatic tire manufactured by the method of claim 1, comprising a central innerliner of an approximately cylindrical form, plural belt layers laid on the circumference of the central innerliner, a tread rubber laid on the circumference of the belt layer, a pair of bead cores each provided with a bead filler substantially extending in a radial direction of the tire, a pair of side carcass layers each turned around the bead core to envelop the bead filler and the bead core and an outside inner liner laid on an inside portion of the side carcass layer, in which a top end portion of the outside innerliner and an inside end portion of the side carcass layer are sandwiched between widthwise end portions of the belt layer and the central innerliner.

4. A method of manufacturing a pneumatic tire, comprising the steps of:
- a step of laying a central innerliner on an outer circumference of a shaping drum with an outer surface form being approximately the same as an inner surface form of a tire product;
- a step of laying a part of plural belt layers constituting a belt on the circumference of the central innerliner;
- a step of laying an approximately ring-shaped sidewall assembly comprising a bead core provided with a bead filler, a side carcass layer folded so as to envelop a circumference of the bead core provided with the bead filler and an outside innerliner laid on an innermost side of the side carcass layer on each side face of the shaping drum;
- a step of laying the remaining belt layer on the circumference of the belt layer and sandwiching a top end of the outside innerliner and an inside top end of the side carcass layer between side end portions of the precedently laid belt layer and subsequently laid belt layer; and
- a step of laying a tread rubber on the circumference of the belt.

5. A pneumatic tire manufactured by the method of claim 4, comprising a central innerliner of an approximately cylindrical form, plural belt layers laid on the circumference of the central innerliner, a tread rubber laid on the circumference of the belt layer, a pair of bead cores each provided with a bead filler substantially extending in a radial direction of the tire, a pair of side carcass layers each turned around the bead core to envelop the bead filler and the bead core and an outside inner liner laid on an inside portion of the side carcass layer, in which a top end portion of the outside innerliner and an inside end portion of the side carcass layer are sandwiched between widthwise end portions of the adjoining belt layers.

6. The method according to claim 4, wherein the sidewall assembly further comprises a cord-reinforced chafer laid on the circumference of the side carcass layer so as to envelop the bead core and a sidewall rubber laid on the circumference of the side carcass layer outward from a top end side of the chafer.

* * * * *